United States Patent [19]
Bullen

[11] Patent Number: 5,946,677
[45] Date of Patent: Aug. 31, 1999

[54] SYSTEM AND METHOD FOR LOCATING AND DELETING COMPUTER FILES STORED ON A MASS STORAGE DEVICE

[75] Inventor: Michael E. Bullen, Delaware, Ohio

[73] Assignee: Electronic Data Systems Corporation, Plano, Tex.

[21] Appl. No.: 08/840,114

[22] Filed: Apr. 14, 1997

[51] Int. Cl.⁶ .................................................. G06F 17/30
[52] U.S. Cl. ................................................. 707/2; 707/200
[58] Field of Search ........................ 707/1–10, 100–104, 707/200–206; 364/260.9, 280.6, 715.02, 962.1; 395/671, 676, 684, 200.33

[56] References Cited

U.S. PATENT DOCUMENTS

| | | | |
|---|---|---|---|
| 5,333,315 | 7/1994 | Saether et al. | 707/1 |
| 5,355,481 | 10/1994 | Sluijter | 707/1 |
| 5,437,029 | 7/1995 | Sinha | 707/200 |
| 5,537,592 | 7/1996 | King et al. | 707/200 |
| 5,675,789 | 10/1997 | Ishii et al. | 707/204 |
| 5,761,655 | 6/1998 | Hoffman | 707/4 |
| 5,819,089 | 10/1998 | White | 395/676 |
| 5,819,261 | 10/1998 | Takahashi et al. | 707/3 |

OTHER PUBLICATIONS

Algorithms For Multidimensional Partitioning of Static File, Doron Rotem & Arie Segev, IEEE Transactions on Software Engineering, vol. 14, issue 11, 11 pages, Nov. 1988.
A Partitioning Method For Grid File Directories; Sei H. Chun, G.E. Hedrick, Huizhu Lu, D.D. Fisher; Computer Software and Applications Conference, 7 pages, 1989.

*Primary Examiner*—Ruay Lian Ho
*Attorney, Agent, or Firm*—L. Joy Griebenow

[57] ABSTRACT

A system and a method for locating and deleting computer files stored in a directory structure in a mass storage device. The method includes the steps of receiving an input and establishing a starting directory and a file search specification. The method further includes storing directory names corresponding to all directories of the directory structure in a directory array and storing file names corresponding to all files of the directory structure that meet the file search specification in a file delete array. Finally, the method includes deleting the files associated with the file names stored in the file delete array. The system may be configured by a computer readable memory to perform the method.

20 Claims, 8 Drawing Sheets

```
SP C:\BASIC\*.*/d                                                    270

----------------------------------------------------------------
Listing Directories. (To list files use the /f switch)
Searching for *.*
----------------------------------------------------------------
C:\BASIC\LIB\*.*                                    398,894      54
C:\BACIC\MEB\*.*                                    655,593      33
C:\BASIC\TEMP1\*.*                                      378       1
C:\BASIC\TEST\*.*                                   309,600      13
----------------------------------------------------------------
DRIVE            :C:
   Free Bytes    :      80,572,416 (80.6 Meg)
   Used Bytes    :     186,658,816 (186.7 Meg)
   Total Bytes   :     267,231,232 (267.2 Meg)
----------------------------------------------------------------
FOUND            :C:\BASIC\*.*
   # of Files Found :            196
   # of Bytes used  :      3,265,036 (3.3 Meg)
----------------------------------------------------------------
```

FIG. 10

SP C:\BASIC\/b+100000/f                    280

```
Listing files. (To list by directory, use the /d switch)
Searching for *.* files greater than or equal to 100000
----------------------------------------------------------------
C:\BASIC\174_BAS.ZIP              09:52:48  04-19-96   277,870
C:\BACIC\FACS-DT.EXE              16:44:28  05-09-96   183,622
C:\BASIC\MEB\174_BAS.ZIP          09:52:48  04-19-96   277,870
DRIVE            :C:
   Free Bytes    :          80,449,536  (80.4 Meg)
   Used Bytes    :         186,781,696  (186.8 Meg)
   Total Bytes   :         267,231,232  (267.2 Meg)
SEARCHED         :C:\BASIC
   # of Files Found   :           196
   # of Bytes used    :        3,265,036  (3.3 Meg)
FOUND            :C:\BASIC\*.*   (Files 100000 bytes long or greater)
   # of Files Found   :           3
   # of Bytes used    :        739,362  (739.4 K) or (.7 Meg)
```

*FIG. 11*

SP C:\SPTEST\*.*/fd                    290

```
Listing Files. (To list by directory, use the /d switch)
Searching for *.*
----------------------------------------------------------------
C:\SPTEST\USER.EXE                       03:11:00  12-31-96   264,016
   Delete (Y)es (N)o (A)ll e(X)it (S)kip the rest :No
C:\SPTEST\SSDATA2. OLD                   06:00:00  10-12-96   235,264
   Delete (Y)es (N)o (A)ll e(X)it (S)kip the rest :Yes
DELETED! C:\SPTEST\SSDATA2. OLDund
C:\SPTEST\USER\JONES.EXE                 03:11:00  12-31-96   264,016
   Delete (Y)es (N)o (A)ll e(X)it (S)kip the rest :No
C:\SPTEST\USER\SSDATA5.OLD               06:00:00  10-12-96   235,264
   Delete (Y)es (N)o (A)ll e(X)it (S)kip the rest :Yes
DELETED! C:\SPTEST\USER\SSDATA5.OLD
DRIVE            :C:
   Free Bytes    :          65,126,400  (65.1 Meg)
   Used Bytes    :         202,104,832  (202.1 Meg)
   Total Bytes   :         267,231,232  (267.2 Meg)
FOUND            :C:\SPTEST\*.*
   # of Files Found   :           4
   # of Bytes used    :        998,560  (998.6 K) or (1 Meg)
DELETED          :C:\SPTEST\*.*
   # of Files Found   :           2
   Bytes freed up     :        470,528  (470.5 K) or (.5 Meg)
```

*FIG. 12*

SYSTEM AND METHOD FOR LOCATING AND DELETING COMPUTER FILES STORED ON A MASS STORAGE DEVICE

TECHNICAL FIELD OF THE INVENTION

The present invention relates generally to the field of computers and more particularly to a system and method for locating and deleting computer files stored on a mass storage device such as a hard disk drive.

BACKGROUND OF THE INVENTION

Mass storage devices may include any device capable of storing computer files such as hard disk drives, compact disk read-only memory (CD-ROM) drives, read/write compact disk, drives, digital tape drives, and the like. The storage capacity of mass storage devices continues to increase. For example, in the 1980's, the storage capacity of hard disk drives were commonly available at anywhere from five megabytes to one-hundred megabytes. Recently, the storage capacity of hard disk drives has dramatically increased to the multiple gigabyte range with plans to continue this dramatic increase in storage capacity. The demand for increased storage capacity has been driven by such factors as larger software applications, such as multimedia-related applications, larger databases, and an increase in computer networks. As a result, mass storage devices often contain gigabytes of information spread across thousands of files in thousands of directories and sub-directories.

The popularity and number of computer networks, such as local area networks (LANs) and wide area networks (WANS), has also dramatically increased. Computer networks typically use a large hard disk drive or a plurality of large hard disk drives to provide storage capacity to the users or clients of a network. Computer networks also commonly employ multiple CD-ROM drives that provide additional amounts of information in the gigabyte range. Consequently, network managers or system administrators have the increased burden of managing gigabytes of information spread across multiple storage devices that often includes thousands of files in thousands of directories and sub-directories.

The dramatic increase in storage capacity and computer networks has created a file management problem. The large storage capacity and associated large amount of information has made file management of computer systems, such as the personal computer and computer networks, more difficult. These difficulties arise from the fact that the number of files stored on a single hard disk drive may be in the hundreds-of-thousands and the number of directories may be in the thousands. This makes it difficult to conveniently and quickly locate a desired set of files and to delete selected files as needed. It is also difficult to determine the effect of a particular act, such as deleting a particular set of files, before actually deleting the files. For example, it is often desirable to know the amount of storage capacity that will be made available as a result of deleting a set of files spread over multiple sub-directories and, sometimes, different storage devices. Unfortunately, the dramatic increase in storage capacity has not been met with an equally dramatic increase in the functionality of computer programs to manage these large mass storage devices.

Normally, computer files related to the same subject matter, such as a project or application program, are organized and stored in a mass storage device using a directory structure or a directory-tree format with a root directory and a plurality of sub-directories arranged at levels below the root directory. Often, for a variety of reasons, it becomes necessary to delete some or all of the files related to a common subject matter to free up additional storage capacity. For example, this may become necessary when a project has ended and the files will no longer be used or after transferring files related to a common subject matter to another machine. This may also be necessary when licensing restrictions require that copies of licensed software be removed at the expiration of a license. Furthermore, this may be necessary when deleting large, unused driver files and other unneeded files that are automatically installed with many application programs. Application programs commonly generate temporary files that are generally unneeded after a short period of time and which must later be located and deleted to free up additional storage capacity.

Existing computer utilities and programs, such as the MICROSOFT MS-DOS "DIR" and "DEL" commands provide only limited capability to accomplish these functions. These utilities are especially limited and cumbersome to use when performing operations across multiple directories and sub-directories. Furthermore, some of these utilities provide inaccurate file total information and do not differentiate between file name entries and sub-directory entries when providing directory information.

SUMMARY OF THE INVENTION

From the foregoing it may be appreciated that a need has arisen for a system and method for locating and deleting computer files stored on a mass storage device, such as a hard disk drive, that eliminate or reduce the problems of prior techniques. In accordance with the present invention, a system and method for locating and deleting computer files stored on a mass storage device are provided which substantially eliminate the disadvantages and problems outlined above.

According to an embodiment of the present invention, a computer-implemented method for locating and deleting specified computer files stored in a directory structure in a mass storage device is provided. The method includes receiving an input and establishing a starting directory and a file search specification. The method further includes storing directory names corresponding to all directories of the directory structure in a directory array and storing file names corresponding to all files of the directory structure that meet the file search specification in a file delete array. Finally, the method includes deleting the files associated with the file names stored in the file delete array.

According to another embodiment of the present invention, a computer readable memory is provided that may be used to configure a system for locating and deleting computer files stored in a directory structure in a mass storage device. The computer readable memory includes a computer-readable medium, and a computer program encoded on the computer-readable medium for enabling the system, such as a computer system, to locate and delete the computer files stored in the directory structure in the mass storage device. The computer program includes computer implemented instructions to receive an input and establish a starting directory and a file search specification. The computer program further includes computer implemented instructions to store directory names corresponding to all directories of the directory structure in a directory array, and to store file names corresponding to all files of the directory structure that meet the file search specification in a file delete array. The computer program also includes computer implemented instructions to delete the files associated with the file names stored in the file delete array.

The present invention provides various technical advantages. A technical advantage of the present invention includes the capability to quickly and accurately locate and delete all computer files meeting a target file search specification and residing at or within a directory structure, thus saving considerable time. Another technical advantage of the present invention includes the capability to determine the associated storage capacity or space that will be made available before actually deleting all files meeting a file search specification and residing in a particular directory structure. Yet another technical advantage includes the capability to locate and display all files meeting both a file search specification that includes a file size that corresponds with a specified file size parameter. Still yet another technical advantage of the present invention includes the capability to locate all directories of a directory structure that correspond to a specified size and size range. Another technical advantage includes the ability to delete files associated with file names stored in a file delete array and deleting the file name entries in the file delete array after searching a current directory and before searching a next current directory. This reduces overall system memory requirements. A further technical advantage of the present invention includes the capability to monitor the network storage capacity consumed by a particular client, project, or user. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 11 is an exemplary output display of the present invention illustrating file information of specified files of a directory structure that are provided at a specified size; and FIG. 12 is an exemplary output display of the present invention illustrating user prompts and associated responses regarding deletion of specified files.

DETAILED DESCRIPTION OF THE INVENTION

Turning first to the nomenclature of the specification, the detailed description which follows is represented largely in terms of processes and symbolic representations of operations by conventional computer components, including a central processing unit (CPU) or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a method or process is generally considered to be a sequence of computer-executed steps or instructions leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during the operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer or computers.

In addition, it should be understood that the programs, processes, methods, etc. described herein are but an example of one implementation of the present invention. The present invention is not limited to any one particular computer, apparatus or computer language. Rather, the present invention may be practiced using various types of general purpose computing machines or devices executing programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory.

Figure 1:
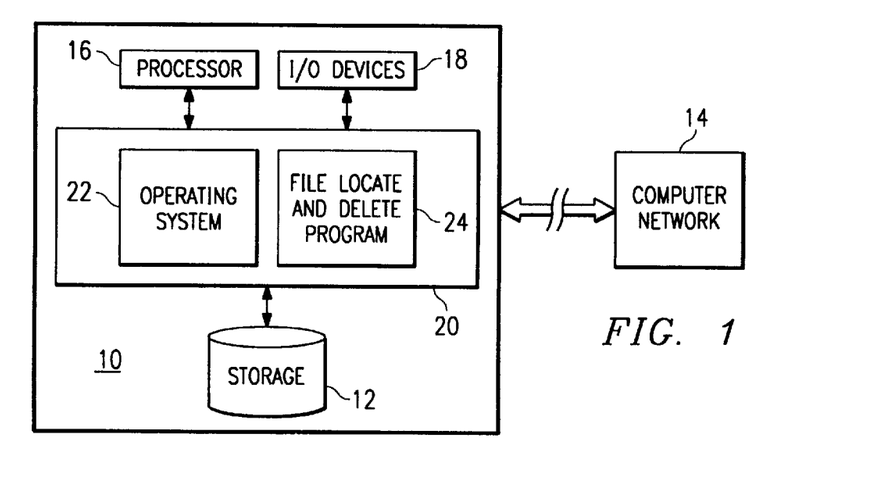
FIG. 1 is an overview block diagram illustrating a computer configured, according to the teachings of the present invention, as a system to locate and delete computer files stored on a mass storage device, such as a hard disk drive.

Referring now in more detail to the drawings, FIG. 1 is an overview block diagram illustrating a computer configured as a system 10 to locate and delete computer files stored on a mass storage device 12. Mass storage device 12 may include any kind of device capable of storing computer files such as a hard disk drive, CD-ROM drive, read/write compact disk drive, digital tape drive, and the like, but will preferably be implemented as a hard disk drive. A computer network 14 is also shown to indicate that system 10 may be coupled with a computer network, such as a LAN, a WAN, the Internet, or any other communications and data exchange system created by connecting two or more computers. However, it should be understood that the present invention may be used to locate and delete computer files stored on a mass storage device used with a single computer or to locate and delete computer files stored on mass storage devices associated with a computer network such as the server or client of a computer network.

System 10 includes a processor 16, I/O devices 18, a memory 20, and mass storage device 12. Memory 20 is shown configured by an operating system 22 and a file locate and delete program 24. Mass storage device 12 may store operating system 22 and file locate and delete program 24 when they are not in use. Similarly, mass storage device 12 may store any number of other computer files such as application files, data files, temporary files, and virtual memory files.

The computer configured as system 10 may be implemented using virtually any computer such as a personal computer, a minicomputer, a work station, a server, a mainframe computer, or any other computer capable of executing a computer program and manipulating computer files. Processor 16, under the control of operating system 22, is used to retrieve, process, store, and display data. Processor 16 communicates control, address, and data signals with operating system 22 and with the remaining components of system 10 through a bus. Processor 16 may include an arithmetic logic unit to assist with performing mathematical operations. Processor 16 interprets and executes instructions that have been fetched or retrieved from memory 20, such as from file locate and delete program 24, and may be implemented as a single integrated circuit or as a combination of integrated circuits. Processor 16 may be implemented using virtually any available microprocessor such as an INTEL or MOTOROLA microprocessor.

Operating system 22 includes a set of computer programs that control the internal functions of system 10. Operating system 22 is typically loaded into memory 20 from mass storage device 12 during start-up or initialization. Operating system 22 may be provided as any available operating system or operating environment such as WINDOWS, WINDOWS 95, WINDOWS NT, OS/2, MS-DOS, and UNIX. In one embodiment, operating system 22 is provided as the MS-DOS operating system which stands for the MICROSOFT Disk Operating System.

I/O devices 18 may include any computer peripheral device that allows data to be exchanged with file locate and delete program 24 and may include such devices as a keyboard, a pointing device, a monitor, a graphics tablet, a modem, and the like. Memory 20 will generally be provided as random access memory (RAM), and the like.

File locate and delete program 24, along with operating system 22, may be provided to memory 20 from mass storage device 12. File locate and delete program 24 will generally be provided as an executable file and may generate various tables, as will be described in more detail below, within memory 20 during execution and operation. File locate and delete program 24 may be implemented using any of a variety of computer programming languages. For example, file locate and delete program 24 may be developed using the combination of a high-level programming language, such as BASIC, and machine language instructions such as assembly language.

During the operation of system 10, operating system 22 is loaded into memory 20 during initialization or boot-up. File locate and delete program 24 may then be loaded into memory 20, either automatically or, preferably, after being selected by a user. Generally, the user will also specify various flags or switches that will instruct file locate and delete program 24 to perform specified functions on a particular directory structure. The directory structure may be specified by providing the name of a particular directory or sub-directory or by defaulting to the current directory. The directory structure is then defined to include the provided directory or sub-directory and all directories located hierarchically below, such as in a treelike, hierarchical structure.

Depending on the specified flags or switches, a user may provide further input in response to prompts generated by file locate and delete program 24 regarding whether a specified file should be deleted. In one embodiment, file locate and delete program 24 may provide the user with a menu or output screen detailing the available flag or switches and their function, in other embodiments, any of a variety of other flags may be provided.

The table below illustrates a preferred embodiment of available flags that may be used with file locate and delete program 24:

| FLAGS: | DESCRIPTION: |
| --- | --- |
| /d | Display specified directories |
| /f | Display specified files |
| /fd | List specified files for deletion with user prompts |
| /fda | Delete specified files without user prompts |
| /-w | Turn off working sign |
| /b#-# | Display directories or files between specified byte size. |

The /d flag instructs file locate and delete program 24 to list the directories of a tree structure defined by the specified directory and to provide statistics concerning the specified directory structure.

Figure 10:
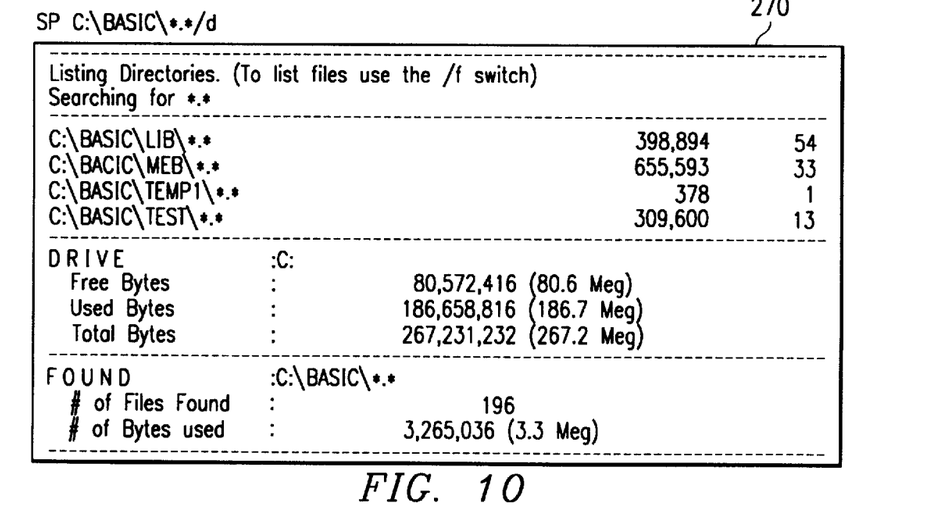
FIG. 10 is an exemplary output display of the present invention illustrating the amount of storage capacity used by a directory structure and the directory structures below.

This may include all or certain sub-directories present in the specified directory structure that contain certain specified files. FIG. 10, discussed more fully below, provides an illustration of one embodiment of an output display that would be generated as a result of using the /d flag. The /f flag instructs file locate and delete program 24 to list the specified files and to provide details of the files located within any directory or sub-directory of the specified directory structure. As mentioned, a directory structure may be indicated by specifying a directory or sub-directory name or by defaulting to the current directory. An example of /f flag is provided in FIG. 11. It should be noted that the use of the terms directory and sub-directory may be used interchangeably throughout.

The /fd and the /fda flags are used to delete specified files within the specified directory structure. The difference between the /fd flag and the /fda flag is the presence of user prompts that are generated before each file is deleted when the /fd option is selected. FIG. 12 illustrates an example of the output display that would be generated as a result of activating the /fd flag. The /-w flag, when activated, instructs file locate and delete program 24 to not display a working symbol and intermediate results during its execution. This flag is beneficial when routing the output of file locate and delete program 24 to a file. By turning the working sign off, the working sign and intermediate results are not included as part of the output file. Finally, the /b flag is used to locate and display directories or files that correspond to a specified size or range of sizes. The /b flag may also be used in conjunction with the /fd and the /fda flags to locate and delete files of a specified size or range of sizes. For example, the /b option may be used to provide all files over a specified size or all files below a specified size. An example of using the /b flag is illustrated more fully in FIG. 11.

It should be noted that file locate and delete program 24, in one embodiment, may be executed at a command prompt by entering the executable file name of the program in the command line. The desired flags may then be provided on the command line after specifying the file name of the executable file of file locate and delete program 24.

Before deleting files, a user may execute file locate and delete program 24 using only the /f, /d, or /b flags, or combinations thereof, to locate particular files or directory structures that may need to be deleted. For example, a directory structure may be provided on mass storage device 12 that corresponds to a project that is now complete. As a consequence, it is desirable to remove all the project related files from the hard disk drive to provide additional available storage capacity in mass storage device 12. After locating the applicable directory structure using file locate and delete program 24, the specified directory structure, including any sub-directories and files, may be deleted. In another example, a desired amount of available storage capacity may be needed on mass storage device 12. As a result, some files and directory structures may need to be deleted. In this case, file locate and delete program 24 may be used to locate a particular directory structure and collection of files that may be deleted using either the /fd or the /fda flags to provide the needed available storage capacity.

Figure 2:
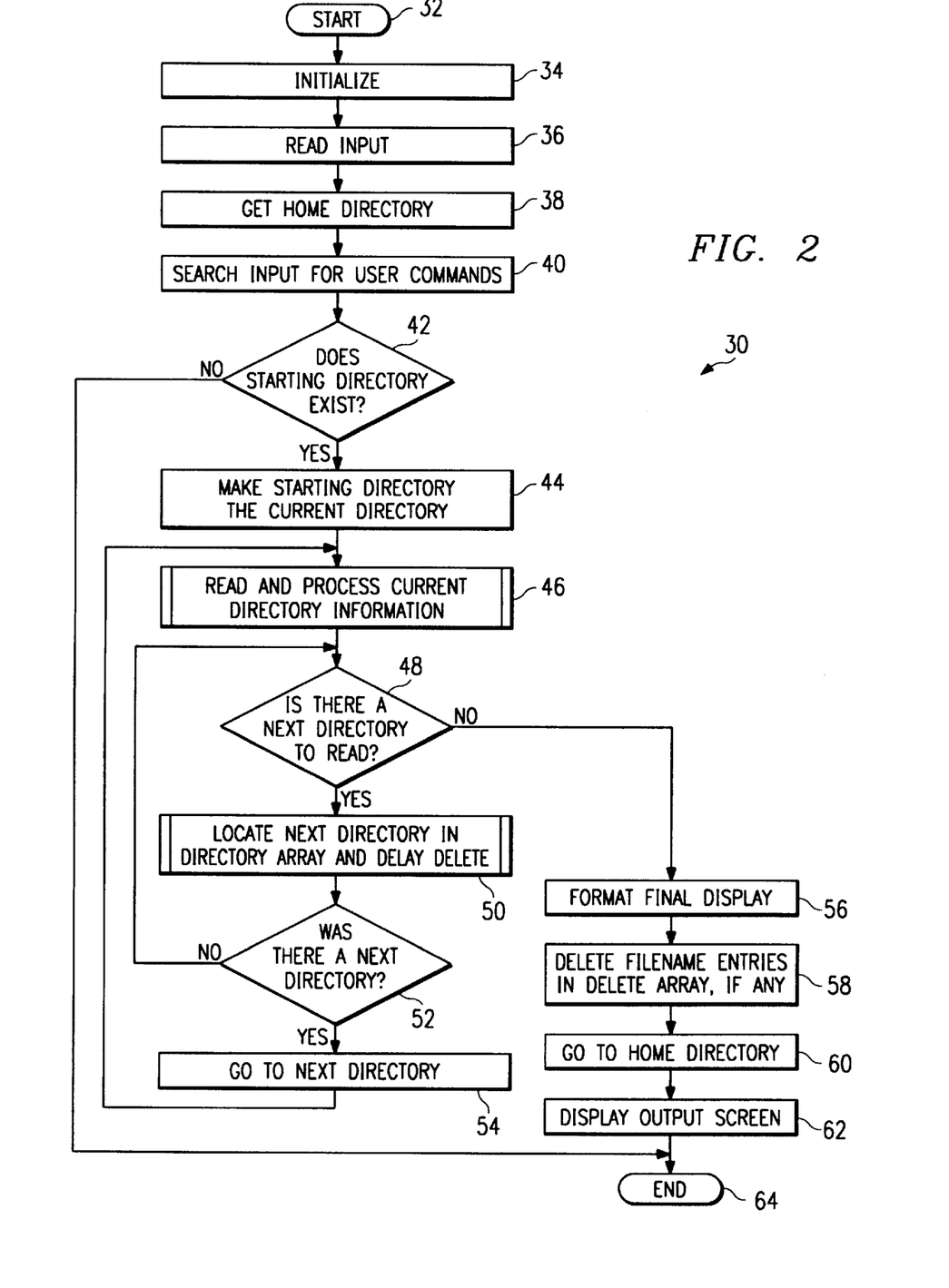
FIG. 2 is an overview flowchart illustrating an exemplary method for locating and deleting computer files stored on a mass storage device.

FIG. 2 is an overview flowchart illustrating an exemplary method 30 for locating and deleting computer files stored on a mass storage device, such as mass storage device 12, that may be performed using file locate and delete program 24 of FIG. 1. Method 30 begins at step 32 and proceeds to step 34 where variables and arrays are initialized and defined. For example, a directory array, a directory display array, and a file delete array may be created and initialized and defined, while a current directory variable may also be initialized and defined. The method then proceeds to step 36 where a user input is read. The user input, in one embodiment, may be provided as a text string and may also include any of the various input flags or switches previously discussed and that are used by method 30 to perform various functions. The input text string is used in step 40 and is discussed more fully below.

Method 30 proceeds next to step 38 where the home directory is located and stored. The home directory may be defined as the directory where a user is located when implementing method 30. For example, assuming that method 30 is implemented within a computer program that is saved as an executable file with a file name of SP.EXE, a user of an MS-DOS based computer may execute or invoke method 30 by entering the following command while located at a "WINDOWS" sub-directory:
C: \WINDOWS\SP.EXE A: \PROJECT1

In this example, the "WINDOWS" directory of the mass storage device designated by the "C" prompt is defined as the home directory.

After locating the home directory, step 40 includes searching the input for its various parts, which are generally provided after the executable file name. In the example above, "SP.EXE" is the executable file name. The various parts of the input may be divided into three parts: (1) a starting directory; (2) a file search specification (or target specification) ; and (3) flags. Each of these three input parts may be stored as variables and used throughout method 30 as desired. In some cases, a user will not specify all of the three parts of the input and thus default values will be assumed. For example, if a starting directory input part is not given, it is assumed that the user desires to search from the home directory.

In such a case, the home directory and starting directory will be the same directory. The following is an example of providing all three input parts:
C:\WINDOWS\SP.EXE C:\DOS\*.TMP /f
In this example, the starting directory part is "C:\DOS\"; the file search specification part is "*.TMP"; and the flag part is "/f".

Proceeding next to decision step 42, the method determines whether the starting directory exists. If not, the method ends by proceeding to step 64. Otherwise, the method proceeds to step 44 where the starting directory is stored as the current directory. The current directory is used in subsequent steps of method 30.

The method then proceeds to step 46 which represents a method for reading and processing current directory information. The method for reading and processing current directory information is described more fully below and is illustrated more fully in FIGS. 3–8. In one implementation, step 46 may be implemented as a sub-routine of method 30 and file locate and delete program 24. Generally, step 46 includes locating and reading all entries provided within the current directory and generating file number and file size totals. An entry includes either the file name of a corresponding file in the directory or the sub-directory name of a corresponding sub-directory one level below the current directory. The entry will also generally include additional information about the corresponding file or directory such as attribute information, file size information, and date of creation information. When a sub-directory name is located, it is stored in a directory array. Step 46 is also used to generate file number and file size totals of all of the files meeting the file search specification, if provided in the user input. Step 46 may also include prompting a user to decide whether to delete specified files if the input includes an input flag part such as the /fd flag. The file names of the files selected to be deleted may then be stored in a file delete array and then deleted in, for example, a later step. Furthermore, step 46 also includes deleting specified files, without a user prompt, if the input includes an appropriate input flag, such as the /fda flag. As such, the file names of the specified files to be deleted are stored in the file delete array and then deleted in, for example, a later step.

Figure 9:
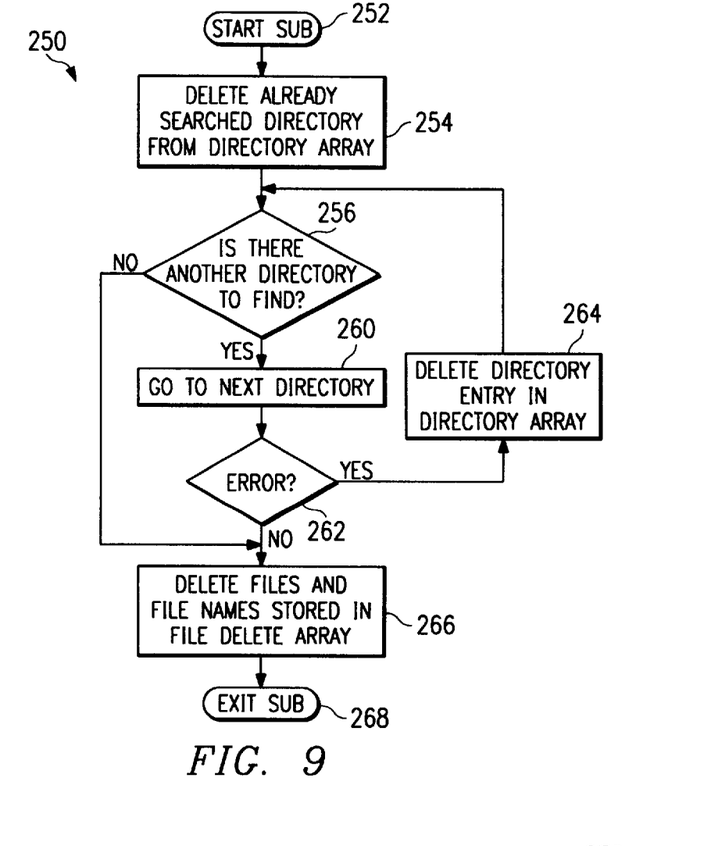
FIG. 9 is a block diagram illustrating an exemplary method for locating the next directory of a directory structure and for performing a delay delete that may be used in the method for locating and deleting computer files of the present invention.

Method 30 proceeds to decision step 48 where the directory array is searched to determine if additional directory entries are present. If so, the method proceeds to step 50 which represents a method for locating the next directory in the directory array and delay delete. The method for locating the next directory in the directory array and delay delete is illustrated in FIG. 9 and described more fully below. In one implementation, this method may be implemented as a sub-routine. Generally, step 50 includes locating the next directory that is provided in the directory array, deleting the current directory entry in the directory array, and deleting any file name entries in the file delete array corresponding to the file name entries stored in the file delete array from the previously or just-searched current directory, if applicable. The deletion of the current directory entry in the directory array and the file name entries in the file delete array free up additional system memory. In other embodiments, the current directory entry is not deleted so that the entire directory structure can be deleted after all files have been deleted. Step 50 is illustrated more fully below in FIG. 9.

Method 30 proceeds next to decision step 52. At decision step 52, method 30 returns to decision step 48 if a next directory cannot be located or if an error occurs when attempting to locate the next directory, otherwise, method 30 proceeds to step 54. Step 54 involves making the next directory the current directory and returning to step 46 where the entries in the new current directory, including both file names and sub-directories, are read or located and processed. At some point, the last sub-directory will be read and processed by step 46 and the method then proceeds to step 48 where a next directory should not exist. At such point, the method proceeds to step 56.

Step 56 involves formatting the output for displaying. Preferably, the output is provided to a monitor or display device for viewing. The method then proceeds to step 58 where, if applicable, any remaining files corresponding to the file names stored in the file delete array are deleted. This occurs when the last current directory to be read includes files that are to be deleted. Also, step 58 involves deleting the current directory entry in the directory array, which is the last sub-directory read and processed by step 46.

Next, the home directory is located in step 60. As was mentioned previously, the home directory was originally stored as a variable in step 38 and is the directory where method 30 was initiated from. Finally, the method proceeds to step 62 where the output is displayed on a monitor or stored in a file. Afterwards, a user prompt located at the home directory is provided. The method ends at step 64.

Figure 3:
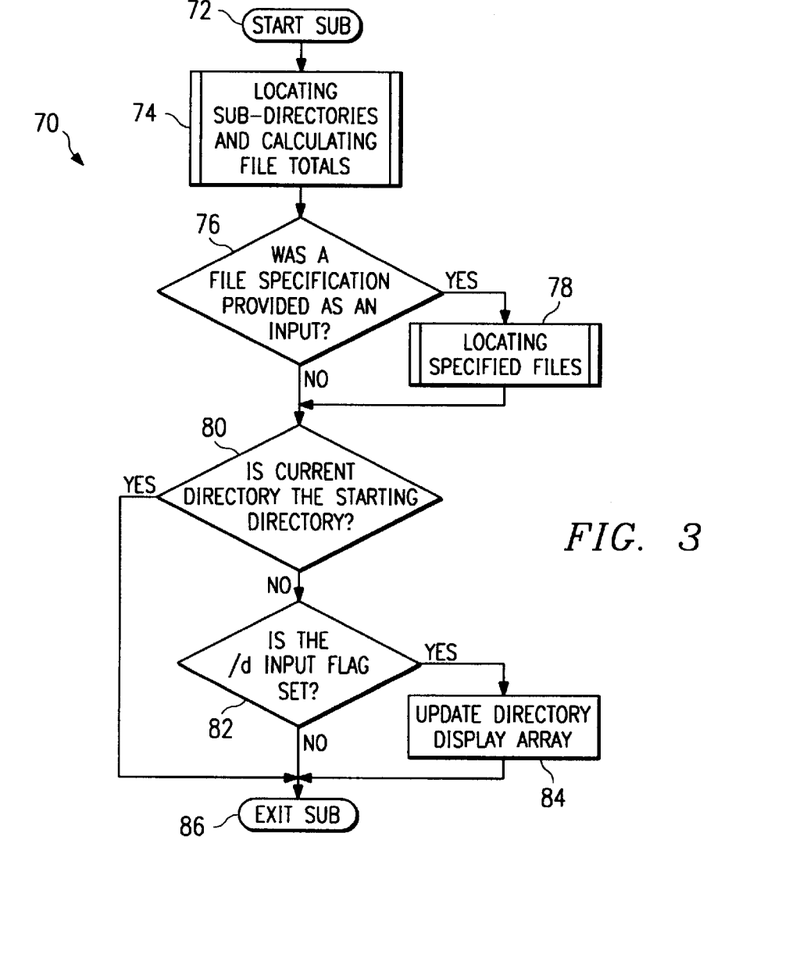
FIG. 3 is a flowchart illustrating an exemplary method for reading and processing current directory information that may be used in the method for locating and deleting computer files of the present invention.

FIG. 3 is a flow chart illustrating an exemplary method 70 for reading and processing current directory information. Method 70 may be used in step 46 of method 30 for locating and deleting computer files as illustrated in FIG. 2. Method 70 may be implemented as a sub-routine and begins at step 72 where the method proceeds to step 74. Step 74 represents a method for locating sub-directories and calculating file total information. The method for locating sub-directories and calculating file total information is described more fully below and is illustrated more fully in FIG. 4. Generally, step 74 involves locating all sub-directories that are one level below the current directory. Once located, the names of these sub-directories are stored within the directory array. Step 74 also includes generating overall mass storage device totals that include the total number of files and the total size of all files of the mass storage device.

Method 70 proceeds to decision step 76 where it is determined whether a file search specification part was included as part of the input requesting that specific files be searched. If so, the method proceeds to step 78 where the specified files of the current directory are located and totals are generated for the number of specified files and the total size of all of the specified files. Once again, the specified files are determined by the file search specification provided by the user as part of the input. Step 78 represents a method for locating specified files that may be implemented as a sub-routine and is described more fully below with respect to FIG. 5.

The method proceeds next to decision step 80 where the method proceeds to step 86 if the current directory is the starting directory; otherwise, the method proceeds to decision step 82. Decision step 82 determines whether the /d input flag was set. The /d input flag may be provided as part of the user input. If so, method 70 proceeds to step 84 where a directory display array, which may be separate from the directory array, is updated with the current directory name, which normally will include the full directory path. Also, the file number totals and the file size totals are stored in the directory display array for later output. The file number totals and the file size totals are updated as additional sub-directories are read and processed by method 70. For example, the totals for a particular sub-directory will include not only the totals for those files in that sub-directory, but also the totals of all files in all sub-directories located subordinate to the particular sub-directory. Method 70 ends at step 86.

Figure 4:
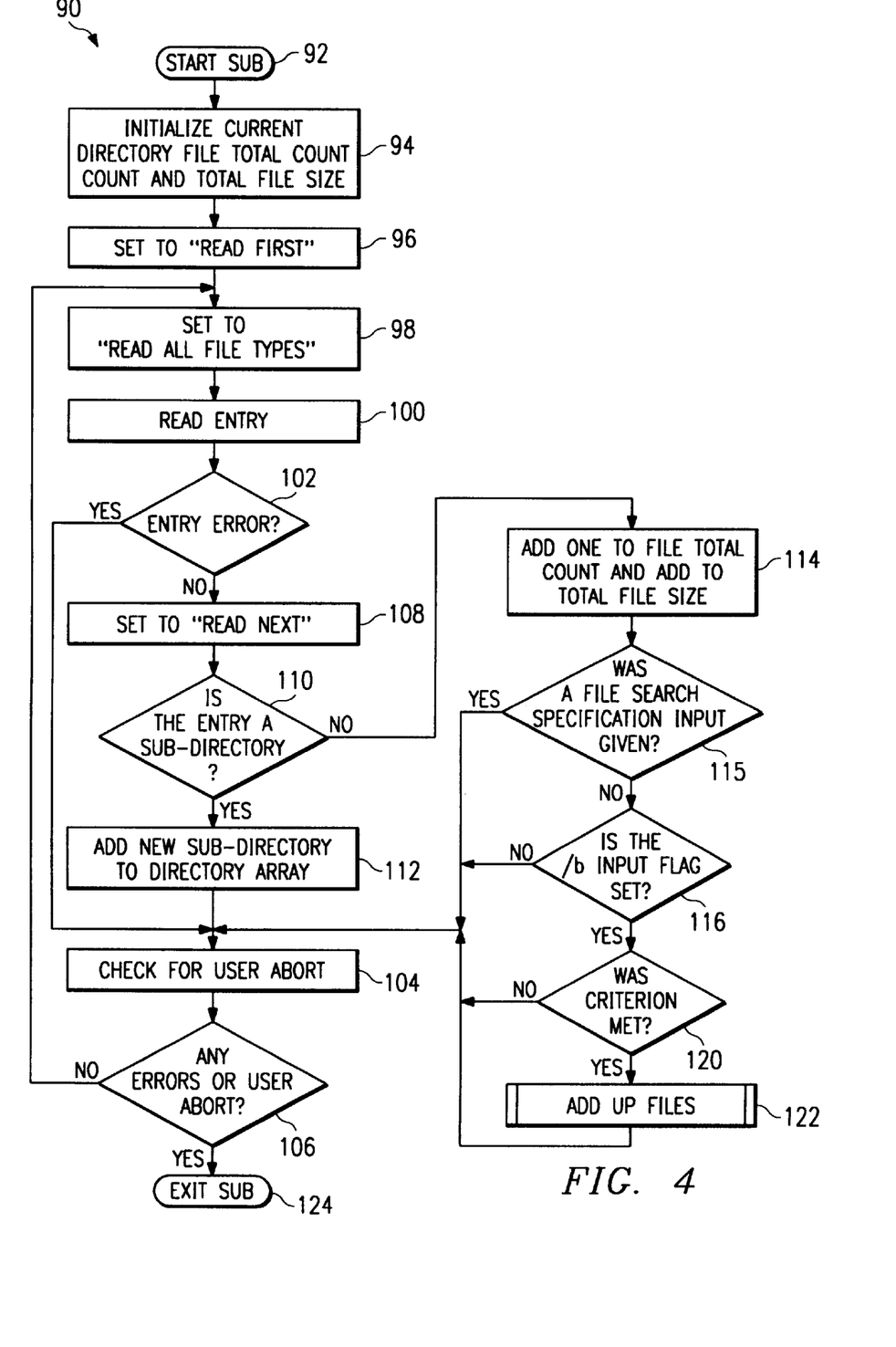
FIG. 4 is a flowchart illustrating an exemplary method for locating sub-directories and calculating file total information that may be used in the method for reading and processing current directory information according to the teachings of the present invention.

FIG. 4 is a flow chart illustrating an exemplary method 90 for locating sub-directories and calculating file total information. Method 90 may be used in step 74 of method 70 for reading and processing current directory information. Method 90, generally, involves reading all of the entries of the current directory, including both file name entries and sub-directory entries, and calculating various file total information.

Method 90 starts at step 92 and proceeds to step 94 where various variables or counters are initialized such as a variable to store the total number of files in the current directory and a variable to store the total size of all of the files in the current directory. The method proceeds next to step 96 where, in one embodiment of method 90, a flag to an assembly language sub-routine is set to read the first entry in the current directory. As was mentioned previously, it should be noted that the entries of the current directory may correspond to either the name of a sub-directory residing directly below the current directory or to the name of a file of the current directory. The assembly language sub-routine simply generates a text entry of the file name of each file residing in the current directory and a text entry for each sub-directory residing directly below the current directory. This assembly language sub-routine represents one implementation of this function and could be developed by one of ordinary skill in the art in any of a variety of computer programming languages. The method then proceeds to step 98 where another flag of the assembly language sub-routine is set to read the file name of all file types. For example, the various types of files may include hidden files, system files, normal files, archived files, and read-only files.

Next, the method proceeds to step 100 where an entry in the current directory is read. In a preferred embodiment, the entries are read as a text string. Once again, the entry may be either a sub-directory name or a file name. The method then proceeds to decision step 102 where it is determined whether an entry error has occurred. If so, the method proceeds to step 104 where method 90 checks for a user abort. This may occur, for example, when a user selects the escape key. The method then proceeds to decision step 106 where it is determined whether any errors have occurred or whether the user has chosen to abort. If so, the method ends at step 124, otherwise, the method returns to step 98 and ultimately back to decision step 102 after reading another entry.

If an entry error is not found at decision step 102, the method proceeds to step 108. Step 108 involves setting a flag of the assembly language sub-routine to read the next entry in the current directory. However, it should be noted that the next directory entry is not actually read in step 108, but, simply, method 90 is in a position to read the next entry when needed. Next, the current entry is analyzed in decision step 110 to determine if it corresponds to the name of a sub-directory or to a file name. If decision step 110 determines that the current entry corresponds to a sub-directory name, the method proceeds to step 112 where the sub-directory name is added to the directory array for future searching. Then, method 90 ultimately returns to step 98, through steps 104 and 106, if neither a user abort nor an error has occurred.

If decision step 110 determines that the current directory entry corresponds to a file name, the method proceeds to step 114. At step 114, the variable corresponding to the total number of files within the current directory is incremented by one. Also, the variable corresponding to the total size of all files within the current directory is incremented by the file size of the associated file of the current entry. After the file total information has been updated in step 114, method 90 proceeds to decision step 115.

Decision step 115 determines whether a file search specification input part was provided. If so, method 90 returns to step 98, through steps 104 and 106, if neither a user abort nor an error has occurred. Otherwise, decision step 115 proceeds to decision step 116.

Decision step 116 involves determining whether the /b input flag was set by the user. If so, the method proceeds to decision step 120 where the file size of the file corresponding to the current directory file name is checked to determine if it meets the criteria outlined by the user when the /b input flag was set. For example, the user may desire to see all files greater than a specified byte size, all files less than a specified byte size, or all files provided at a size greater than a first specified file size but less than a second specified file size. If the criterion is met, the method proceeds to step 122, which is described more fully below, otherwise, method 90 proceeds to step 104 as described above. Referring back to decision step 116, if the /b input flag was not set by the user, the method also proceeds to step 104 and then back to either step 98 to read the next entry of the current directory or to step 124 where method 90 ends after the last entry in the current directory has been read. An error occurs when there are no more entries to read and decision step 106 proceeds to step 124 where method 90 ends.

Figures 6, 7:
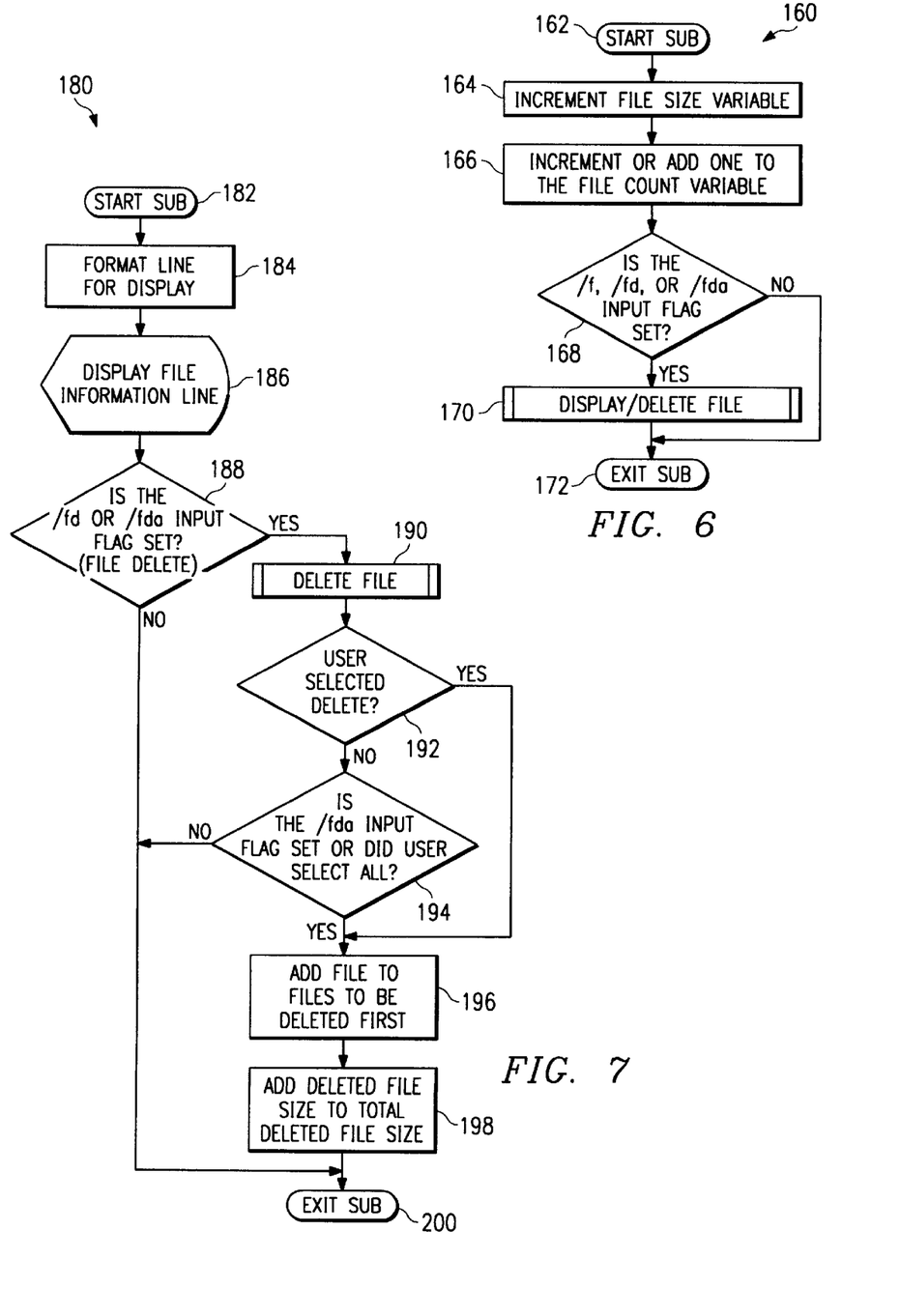
FIG. 6 is a flowchart illustrating an exemplary method for adding up file sizes that may be used in both the method for locating sub-directories and calculating file total information and the method for locating specified files.
FIG. 7 is a flowchart illustrating an exemplary method for displaying file information and deleting files that may be used in the method for adding up file sizes.

Step 122 is illustrated more fully in FIG. 6 and may be implemented as a sub-routine. Generally, step 122 involves calculating the total number of files that meet a particular criterion and the total size of all files meeting this particular criterion. The method of step 122 also involves displaying and deleting specified files if the user has provided the appropriate user input flag to delete specified files. These details are described more fully below and are illustrated more fully in FIGS. 6-8.

Figure 5:
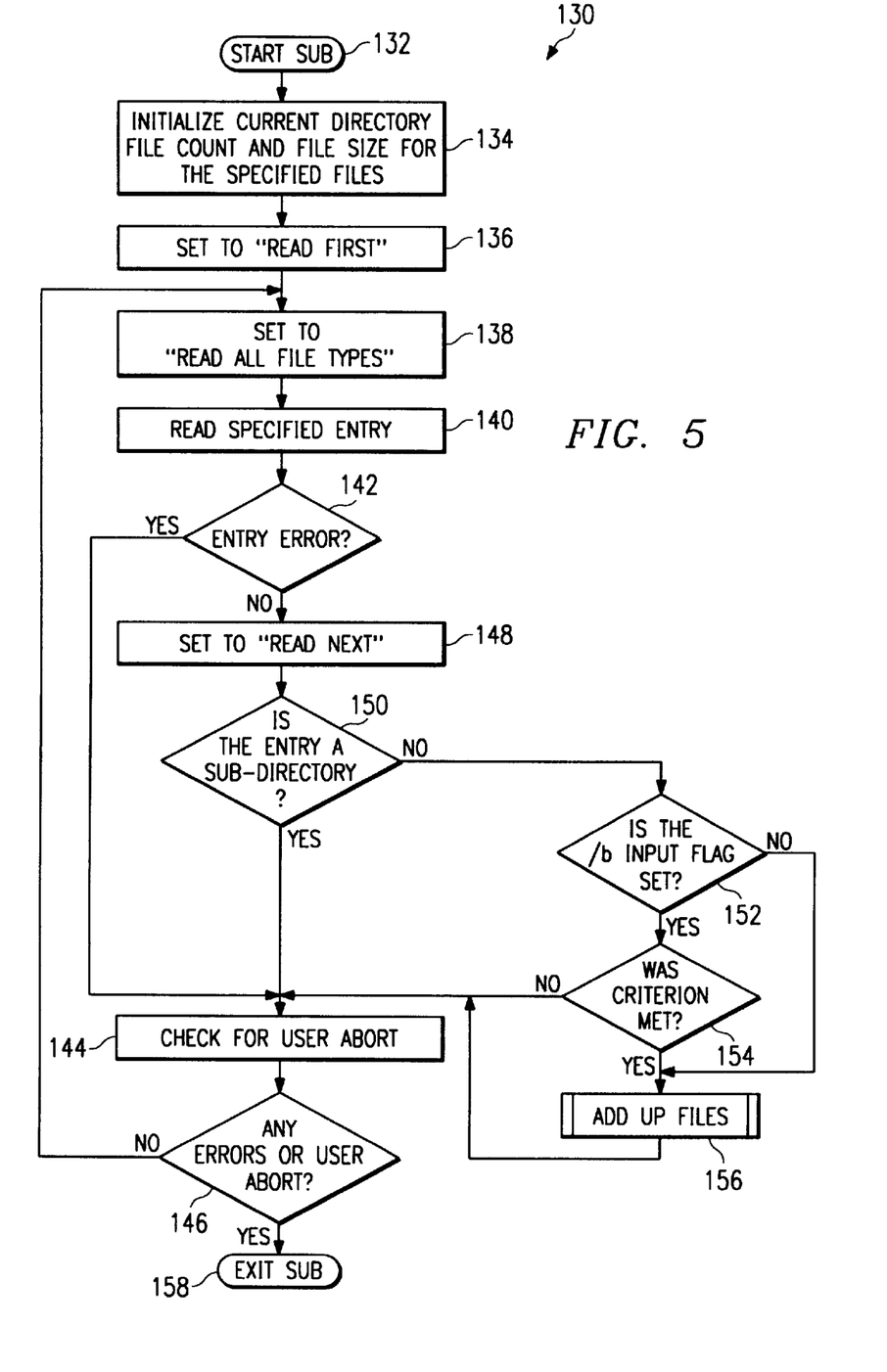
FIG. 5 is a flowchart illustrating an exemplary method for locating specified files that may be used in the method for reading and processing current directory information.

FIG. 5 is a flow chart illustrating exemplary method 130 for locating specified files that may be implemented as step 78 of the method for reading and processing current directory information as illustrated in FIG. 3. As discussed previously, step 78 is invoked in method 70 while processing a current directory entry and in which the user has provided an input part that includes a file specification part which specifies a specific file type to be searched.

Decision step 115 determines whether a file search specification input part was provided. If so, method 90 returns to step 98, through steps 104 and 106, if neither abort nor an error has occurred. Otherwise, decision step 115 proceeds to decision step 116.

Method 130 begins at step 132 and proceeds to step 134. Step 134 involves initializing variables and counters such as a variable that counts the total number of files meeting the file specification and a variable that stores the total size of all files meeting the file specification. The method proceeds next to step 136 where a flag to assembly language sub-routine is set to read the first entry in the current directory that includes only the specified file types defined by the file search specification input part. This is similar to step 96 in method 90 of FIG. 4. The method then proceeds to step 138 where another flag of the assembly language sub-routine is set to read the file name of all file types, such as hidden files, system files, normal files, archived files, and read-only files. Step 138 is similar to step 98 of method 90.

Method 130 then proceeds to step 140 where the first entry meeting the file search specification input is read.

The file search specification may also be referred to as the target specification. For example, the file search specification input may be provided as "*.tmp" and thus step 140 would involve finding all entries, generally a file name entry, that include the "tmp" file extension as part of the file name. Next, decision step 142 is encountered where it is determined whether an entry error has occurred. If so, the method proceeds to step 144 where it is determined whether a user abort has occurred. The method then proceeds to decision step 146 where if either an error has occurred of if a user abort has been detected, method 130 will end at step 158. Otherwise, method 130 returns to step 138 and proceeds again.

If no entry error was found in decision step 142 as a result of reading an entry corresponding to a file search specification, the method proceeds to step 148 where a flag within the assembly language sub-routine is set to read the next entry that meets the file search specification input. Once again, it should be noted that this entry is not actually read but the assembly language sub-routine is prepared to read the next entry when required. Method 130 then proceeds to decision step 150 where the current entry, which was read in step 140, is analyzed to determine if it corresponds to a file name or a sub-directory name. Normally, the current entry in method 130 will correspond to a file name because the file search specification input will generally eliminate most sub-directory names. However, in certain instances, a sub-directory may have the same name as provided by the file search specification input. If the current entry is found to be a file name, the method proceeds to decision step 152; otherwise, the method proceeds to step 144.

Decision step 152 involves determining whether the /b input flag has been set. If so, the method proceeds to decision step 154 where it is determined whether the criterion has been met; otherwise, the method proceeds to step 156. If the criterion has been met, the method also proceeds to step 156. If the criterion has not been met, the method proceeds to step 144 and ultimately back to step 138.

Step 156 is a method that may be implemented as a sub-routine and may be implemented as the same or similar method as previously described in step 122 of method 90 of FIG. 4. Generally, step 156 involves adding up the total number of files meeting the file search specification, and the /b or file size criterion when set, and determining the total size of all these files. Also, step 156 involves displaying and deleting specified files when requested by the user by providing an appropriate user input flag to delete the specified files. These details are described more fully below and are illustrated more fully in FIGS. 6-8. Method 130 then proceeds to step 144 where the next entry will be read, as long as an error or an abort does not occur. After the final entry has been read, an entry error will occur and will be detected in decision step 142. The method will then end at step 158.

FIG. 6 is a flow chart illustrating an exemplary method 160 for adding up file sizes. Method 160 may be used both in method 90 of FIG. 4 and method 130 of FIG. 5. More specifically, method 160 may correspond to step 122 of method 90 of FIG. 4 and step 156 of method 130 of FIG. 5. Generally, method 160 involves maintaining a file count of all the entries and a total file size of all entries processed by method 160.

Method 160 begins at step 162 and proceeds to step 164 where the file size variable or counter is incremented by an amount corresponding to the file associated with the file name currently being processed by method 160. It should also be noted that method 160 proceeds for each current directory being processed by step 46 of method 30 of FIG. 2. Method 160 proceeds next to step 166 where the file count variable is incremented by one for the current directory for each entry processed by method 160.

The method proceeds next to decision step 168 where it is determined whether any of the following input flags have been set: /f, /fd, and /fda. If any of these input flags have been set, method 160 proceeds to step 170. Step 170 may be implemented as a method for displaying file information and deleting files as needed. The method of step 170 may be implemented as a sub-routine and is discussed fully below and illustrated more fully in FIG. 7. Generally, step 170 involves displaying files meeting a file search specification and deleting those files as desired by the user. Also, step 170 involves prompting the user to delete specified files when the /fd input flag has been set. Method 160 ends at step 172.

FIG. 7 is a flow chart illustrating an exemplary method 180 for displaying file information and deleting files. Method 180 may be implemented as a sub-routine and may be implemented as step 170 of method 160 of FIG. 6.

Method 180 begins at step 182 and proceeds step 184 where a line is formatted for display. This formatted line corresponds to the current entry of the current directory that is being processed by method 160. Method 180 proceeds next to step 186 where the formatted line is displayed at an output device such as a computer monitor and includes information about the specified file.

The method continues at decision step 188 where it is determined whether either the /fd or the /fda input flags have been set. If so, the method proceeds to decision step 190 where the file corresponding to the current entry may be marked for deletion. Otherwise, method 180 proceeds to step 200 where the method ends.

Figure 8:
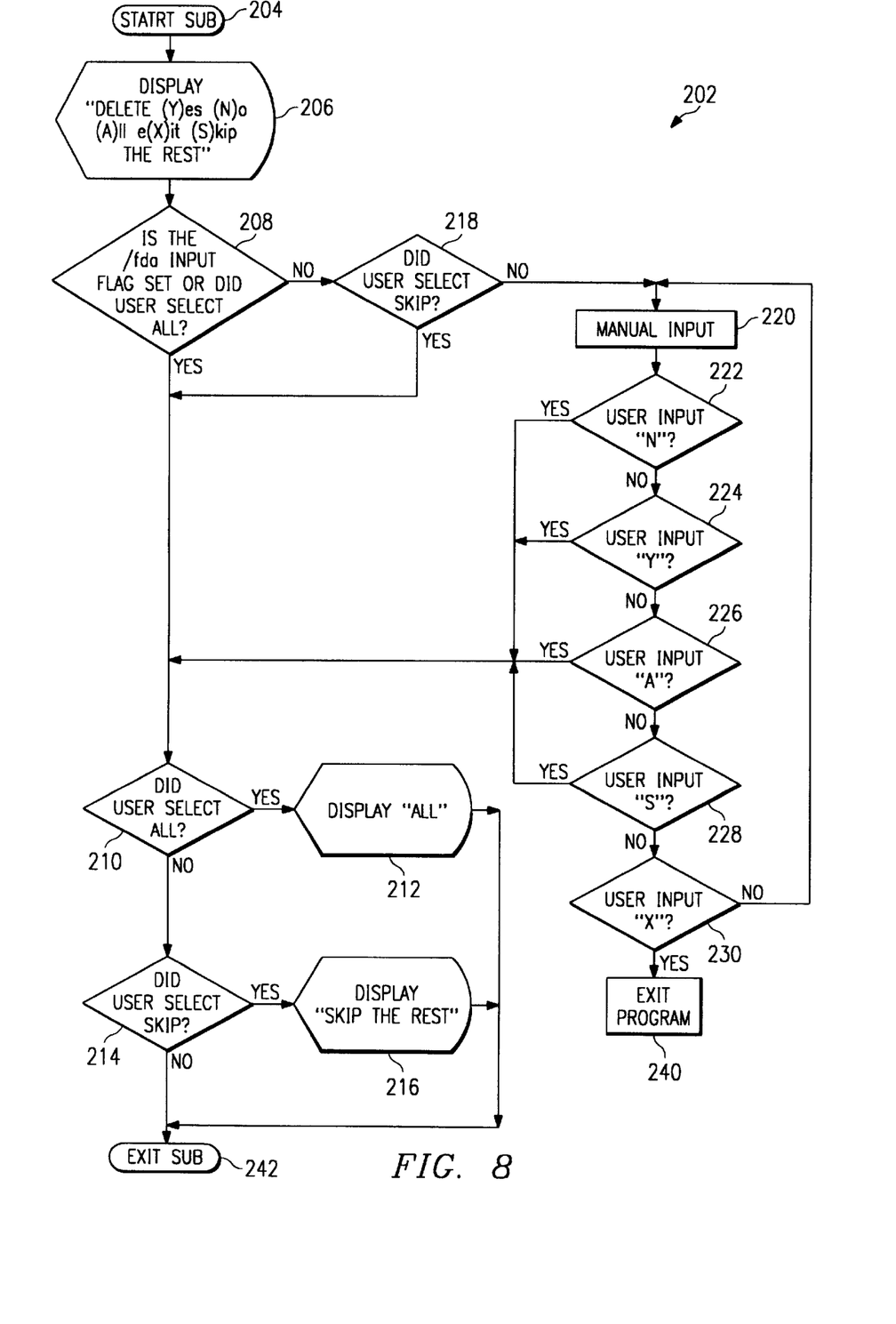
FIG. 8 is a flowchart illustrating an exemplary method for deleting files that may be used in the method for displaying file information and deleting files.

Step 190 may be a method for deleting files and may be implemented as a sub-routine. One potential implementation of step 190 is illustrated in FIG. 8 and is discussed more fully below. Generally, step 190 involves displaying an option to delete or not delete the file corresponding to the current entry if the /fd input flag was set. In such a case, the user may be prompted to delete all remaining files corresponding to any future entry, to exit the program or method, or to skip or not delete any of the remaining files associated with future file name entries. An example of this is illustrated in FIG. 12. If the /fda input flag was set, step 190 will not receive user input.

Method 180 proceeds next to decision step 192 where the user input is checked to determine if the user selected delete. If so, method 180 proceeds to step 196 where the current entry file name is marked for deletion. This is accomplished by storing the current file name in the file delete array so that it may be deleted in a later step. At this point, the method proceeds to step 198 where the size of the associated file of the current entry file name is added to a variable which corresponds to the total size of all files that will be deleted. The method then ends at step 200.

Returning back to decision step 192, if the user input did not indicate that the file associated with the current entry should be deleted, or if the /fda input flag was set the method proceeds to decision step 194 where it is determined whether the /fda input flag is set or whether the user selected the "ALL" option. If so, this information is stored as a variable and all subsequent files encountered by method 180 will be marked for deletion. If the /fda input flag is set or if the user selected "ALL", the method proceeds to step 196 where the file associated with the file name of the current entry is marked for deletion and stored in the file delete array. The method proceeds next to step 198 where the variable corresponding to the total size of all files that will be deleted is updated with the size of the file associated with the file name of the current entry. The method then ends at step 200. Otherwise, the method proceeds from decision step 194 to step 200 where the method ends.

FIG. 8 is a flow chart illustrating an exemplary method 202 for deleting files. Method 202 may be implemented as step 190 of method 180 of FIG. 7. The method starts at step 204 and proceeds to step 206 where, in one embodiment, the user is prompted to either delete a file, not delete a file, delete all remaining files, to exit the program or method, or to skip the remaining files. An example of this is provided in FIG. 12. After prompting the user, the method proceeds to decision step 208 where it is determined whether the /fda input flag has been set or whether the user selected the "ALL". If so, the method proceeds to decision step 210 where, if the user selected "ALL", the method proceeds to step 212 where "ALL" is displayed and method 202 ends at step 242. If the user did not selected "ALL", the method proceeds to decision steps 214 where, if the user selected "SKIP", the method proceeds to step 216 where the message "Skip the rest" may be displayed. Method 202 then ends at step 242.

Referring back to decision step 208, if neither the /fda input flag is set or the user did not select "ALL", the method proceeds to decision step 218. Decision step 218 queries whether the user selected "SKIP". If so, the method proceeds to step 210 as described previously. It should be noted that the first time method 202 is encountered, the user has not provided any input and thus the user could not have selected the "ALL" option or the Skip option. However, once either of these two options are selected, they may be stored in a variable and this variable may be checked during future encounters with method 202. If the user did not select "SKIP", the method proceeds to step 220. Step 220 is provided to indicate that a user input is received and thus the user may have selected any one of the options displayed by step 206. Decision steps 222 through 230 are provided to determine which option was selected. If the EXIT option is selected, the entire program or method is exited as indicated by step 240. For example, method 30, as illustrated in FIG. 2, is terminated by going to step 64 of method 30.

If any of the other user inputs are selected, they are stored and method 202 proceeds to decision step 210. If the user selected ALL or SKIP, an appropriate message is displayed such as that indicated in steps 212 and 216. Finally, the method ends at step 242.

FIG. 9 is a block diagram illustrating an exemplary method 250 for locating the next directory of a directory structure and for performing a delay delete. Referring back to method 30 of FIG. 2, method 250 may be provided to function as step 50 of method 30.

Method 250 begins at step 252 and proceeds to step 254 where the just previously searched directory entry is deleted from the directory array. This is performed to free-up and conserve available memory. The method then proceeds to decision step 256 where the directory array is analyzed to determine if a next directory is available to read and process. If so, the method proceeds to step 260 where the entry and the directory array corresponding to the next entry is located. If an error occurs, decision step 262 proceeds to step 264 where the directory entry corresponding to the next directory is deleted from the directory array and method 250 returns to decision step 256. Otherwise, the method proceeds to step 266. Referring back to decision step 256, if there is not a directory entry within the directory array, the method proceeds from decision step 256 to step 266.

Decision step 266 performs the delay delete by deleting all files corresponding to the file name stored in the file delete array. The file delete array was previously populated with the file names of the files to be deleted as mentioned previously when discussing step 196 of method 180 as illustrated previously in FIG. 7. After all of the associated files have been deleted, the file names stored within the file delete array are also deleted to conserve available memory. Finally, method 250 ends at step 268.

FIG. 10 is an exemplary output display 270 illustrating the effects of executing file locate and delete program 24 in response to providing the command shown above output display 270. File locate and delete program 24 may be stored as an executable file with the file name "SP". As is illustrated in FIG. 10, the command includes a starting directory input of "C:\BASIC\" and a file search specification input of "*.*". Also, the input flag "/d" is set. As a consequence of providing these input parts, output display 270 is generated.

Output display 270 illustrates the size of four directories residing below the "BASIC" directory. Also, the number of files residing in each of the corresponding directories is provided at the far right, next to the size statistics. It should also be noted that the file size and the number of files residing in each directory corresponds not only to those files residing directly within the corresponding directory but also to all other files residing below the indicated directory, if any. In this matter, a user can conveniently look at one of the entries and determine the amount of space that will be made available if any of the directories structures are deleted. A directory structure is, once again, defined as a reference directory or sub-directory in all sub-directories provided below the reference directory or sub-directory. Also, output 270 illustrates the totals for drive C and the number of files residing within the "BASIC" directory and all sub-directories below the "BASIC" directory. In this case, 196 files were found and about 3.3 megabytes are being used by files residing in the "BASIC" directory and all sub-directories below the "BASIC" directory. This allows a system manager or user to know exactly how much space or storage capacity will be made available if the present invention is used to delete all files residing in this directory structure.

FIG. 11 is an exemplary output display 280 of the present invention illustrating file information of specified files within a directory structure. As illustrated, the user input that is provided to execute file locate and delete program 24 is a starting directory of "C:\BASIC\" and the input flags of /b and /f. The /b input flag is provided with the additional specification that only files with sizes greater than 100,000 bytes are to be displayed. Once again, the /f input flag designates that each specified file should be displayed. In this case, all files are specified.

Output display 280 displays three files meeting the byte size requirement and corresponding file information for each of these files. Also, information regarding the storage capacity of the entire drive is provided along with all files residing within and below the "BASIC" directory structure. Finally, the totals of all of the files greater than 100,000 bytes and residing within the "BASIC" directory structure are provided.

It should be noted that a user of file locate and delete program 24 will generally use various combinations and iterations of the /d, /f, and the /b flag to locate a desired set of files to delete. Once located, either the /fd or the /fda flag may be used to delete the desired set of files.

FIG. 12 is an exemplary output display 290 of the present invention illustrating user prompts and associated responses regarding the deletion of specified files. In this example, file locate and delete program 24 is used to delete specified files as prompted. As illustrated, the user input provided in this example includes a starting directory of "C:\SPTEST\" and a file search specification input of "*.*". Also, the "/fd" input flag is provided which instructs file locate and delete program 24 to prompt the user for each file meeting the file search specification.

Output display 290 provides an example of the user prompts which allows the user to either: (1) delete the file; (2) not delete the file; (3) delete all files; (4) exit; or (5) skip the rest of the files. In the first prompt illustration, the file USER.EXE is located and the user elects to not delete this file. In the next example, the file SSDATA2.OLD is provided and the user elects to delete this file by selecting the "Y" input. Next, the user is prompted to act on the file JONES.EXE to which the user elects not to delete. Finally, the user is prompted to act on the file SSDATA5.OLD. The user then elects to delete this file by selecting the "YES" input option.

Output 290 also provides the drive total information and the total files found along with corresponding size information. Output 290 then provides information corresponding to the number of files actually deleted and the number of bytes made available by the deleted files.

Thus, it is apparent that there has been provided, in accordance with the present invention, a system and method for locating and deleting computer files stored on a mass storage device, such as a hard disk drive, that satisfy the advantages set forth above. Although the preferred embodiment has been described in detail, it should be understood that various changes, substitutions, and alterations can be made herein without departing from the scope of the present invention. For example, although the present invention has been described and illustrated using exemplary flowcharts, the present invention is not limited to only this one embodiment and may in fact be implemented and described using any of a variety of other flows. Similarly, the present invention may be implemented on a single-user computer, a multi-user computer, or a computer coupled to a computer network such as a local area network. Other examples of changes, substitutions, and alterations are readily ascertainable by one skilled in the art and could be made without departing from the spirit and scope of the present invention as defined by the following claims.

What is claimed is:

1. A computer-implemented method for locating and deleting computer files stored in a directory structure in a mass storage device, the method comprising the steps of:

receiving an input and establishing a starting directory and a file search specification;

storing directory names corresponding to all directories of the directory structure in a directory array;

storing file names corresponding to all files of the directory structure that meet the file search specification in a file delete array; and deleting the files associated with the file names stored in the file delete array.

2. The computer-implemented method of claim 1, further comprising the steps of:
generating a file size total of all files of the directory structure that meet the file search specification; and
displaying the file size total.

3. The computer-implemented method of claim 1, wherein the deleting the files step includes displaying a prompt requiring an additional input before deleting the files associated with the file names stored in the file delete array.

4. The computer-implemented method of claim 1, wherein the deleting the files step includes displaying a prompt requiring an additional input before deleting each one of the files associated with the file names stored in the file delete array.

5. The computer-implemented method of claim 4, wherein the prompt requires the additional input to either delete the file, not delete the file, or skip the rest of the files.

6. The computer-implemented method of claim 1, wherein the file search specification includes a file size parameter that allows files meeting a file size range to be specified.

7. The computer-implemented method of claim 1, wherein the file search specification identifies all files of the directory structure and the deleting the files step further includes deleting the directory structure in addition to deleting all of the files associated with the directory structure and stored in the file delete array.

8. A computer-implemented method for locating and deleting computer files stored in a directory structure in a mass storage device, the method comprising the steps of:
receiving an input and establishing a starting directory and a file search specification;
establishing the starting directory as the current directory and storing the directory name in a directory array;
searching the current directory for file name entries corresponding to files provided in the current directory that meet the file search specification and storing these file names in a file delete array;
searching the current directory for directory name entries positioned hierarchically below the current directory and within the directory structure and storing these directory names in the directory array;
establishing the next directory in the directory array, if a next directory exists, as the current directory and returning to the searching the current directory steps; and
deleting the files associated with the file names stored in the file delete array.

9. The computer-implemented method of claim 8, further comprising the step of:
generating a file size total of all files of the directory structure that meet the file search specification; and
displaying the file size total.

10. The computer-implemented method of claim 8, wherein the deleting the files step includes displaying a prompt requiring an additional input before deleting the files associated with the file names stored in the file delete array.

11. The computer-implemented method of claim 8, wherein the deleting the files step includes displaying a prompt requiring an additional input before deleting each one of the files associated with the file names stored in the file delete array.

12. The computer-implemented method of claim 11, wherein the prompt requires the additional input to either delete the file, not delete the file, or skip the rest of the files.

13. The computer-implemented method of claim 8, wherein the deleting the files step further includes deleting the files associated with the file names stored in the file delete array and deleting the file name entries in the file delete array after each time the searching the current directory for file name entries step is performed.

14. The computer-implemented method of claim 8, wherein the file search specification identifies all files of the directory structure and the deleting the files step further includes deleting the directory structure in addition to deleting all of the files associated with the directory structure and stored in the file delete array.

15. The computer-implemented method of claim 8, wherein the input is provided as a text string and the receiving an input step includes establishing a home directory.

16. The computer-implemented method of claim 8, wherein the file search specification defines target files.

17. The computer-implemented method of claim 8, wherein the file search specification includes a file size parameter that allows files meeting a file size range to be specified.

18. A computer readable memory comprising:
a computer-readable medium; and
a computer program encoded on the computer-readable medium for enabling a computer to locate and delete computer files stored in a directory structure in a mass storage device, the computer program comprising:
computer implemented instructions to receive an input and establish a starting directory and a file search specification;
computer implemented instructions to store directory names corresponding to all directories of the directory structure in a directory array;
computer implemented instructions to store file names corresponding to all files of the directory structure that meet the file search specification in a file delete array; and
computer implemented instructions to delete the files associated with the file names stored in the file delete array.

19. The computer readable memory of claim 18, wherein the computer program further includes:
computer implemented instructions to generate a file size total of all files of the directory structure that meet the file search specification; and
computer implemented instructions to display the file size total.

20. A system for locating and deleting computer files stored in a directory structure in a mass storage device, the system comprising:
a computer-readable medium;
a computer program encoded on the computer-readable medium; and
a processor responsive to the computer-readable medium as configured by the computer program to:
receive an input and establish a starting directory and a file search specification;
store directory names corresponding to all directories of the directory structure in a directory array;
store file names corresponding to all files of the directory structure that meet the file search specification in a file delete array; and
delete the files associated with the file names stored in the file delete array.

\* \* \* \* \*